(12) United States Patent
Tang et al.

(10) Patent No.: US 8,850,244 B2
(45) Date of Patent: Sep. 30, 2014

(54) WAKE-ON-LAN BETWEEN OPTICAL LINK PARTNERS

(75) Inventors: Norman Tang, Los Altos, CA (US);
Nick Peng, Santa Clara, CA (US);
Anthony Nguyen, San Jose, CA (US);
David Lai, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 13/165,275

(22) Filed: Jun. 21, 2011

(65) Prior Publication Data

US 2012/0331320 A1 Dec. 27, 2012

(51) Int. Cl.
*G06F 1/32* (2006.01)
*H04L 12/12* (2006.01)

(52) U.S. Cl.
CPC .............. *G06F 1/3209* (2013.01); *Y02B 60/34* (2013.01); *Y02B 60/32* (2013.01); *H04L 12/12* (2013.01)
USPC ............................ 713/320; 713/323; 713/324

(58) Field of Classification Search
None
See application file for complete search history.

(56) References Cited

U.S. PATENT DOCUMENTS

| | | | |
|---|---|---|---|
| 2002/0157030 A1* | 10/2002 | Barker et al. | 713/320 |
| 2008/0212964 A1* | 9/2008 | Gao et al. | 398/58 |
| 2009/0263127 A1* | 10/2009 | Haran et al. | 398/38 |
| 2011/0211837 A1* | 9/2011 | Sugawa et al. | 398/67 |

\* cited by examiner

*Primary Examiner* — Paul Yanchus, III
(74) *Attorney, Agent, or Firm* — Merchant & Gould

(57) ABSTRACT

Embodiments described herein achieve Wake-on-LAN to allow optical modules the ability to wake up link partners instantaneously when there is data to be transmitted or received. As such, Wake-on-LAN features are provided for a side-band handshaking protocol and channel that is independent from the normal data traffic path.

20 Claims, 5 Drawing Sheets

WAKE-ON-LAN BETWEEN OPTICAL LINK PARTNERS

TECHNICAL FIELD

The present disclosure relates generally to providing an optical module capable of out-of-band handshaking between optical modules or link partners to enter and awaken the modules from a power-reserved or standby mode.

BACKGROUND

As part of "green" initiatives to reduce pluggable module power consumption, it may be desired to consider module power saving opportunities in all modes of module operations. Reducing the average use of power during module normal operation is key. It is also important to address the power savings in other modes or a link-down state where there is no traffic to be transmitted or received between the link partners. During link-down state, most of the power hungry components may be turned off.

However, the optical module must have the ability to wake up its link partner instantaneously when there is data to be transmitted or received. As such, it may be desirable to provide a Wake-on-LAN feature used in a computing device between the optical partners or link partners. It may also be desire for such a feature to co-exist with legacy optical modules. As such, the Wake-on-LAN feature may need to be transparent and fully inter-operable with legacy modules while avoiding performance degradations. In other words, there is a need for a system with a side-band handshaking protocol and channel that is independent from the normal data traffic path.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

In various embodiments, a method may be provided comprising: determining that an optical module is capable of entering a power saving mode. A power saving handshake may be initiated and subsequently confirmed. The optical module may be adjusted to achieve a power saving mode. Later an idle pattern may be sent, wherein the idle pattern serves to end the established power saving mode.

Embodiments of the present invention for Wake-on-LAN may be implemented in hardware, software, firmware, or a combination thereof (collectively or individually also referred to herein as logic). To the extent certain embodiments, or portions thereof, are implemented in software or firmware, executable instructions or code for performing one or more tasks of Wake-on-LAN are stored in memory and executed by a suitable instruction execution system. In the context of this document, a computer readable medium is an electronic, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Embodiments described in the present disclosure may provide power savings when both sides of a connection have no traffic to send when Wake-on-LAN is employed on each side of the connection. Notably, Wake-on-LAN is backward compatible for both a host and a optical transceiver in communication with one another. Typically, the majority of processing may be handled by the transceiver, and the host may only need to be aware of relevant memory addresses within the transceiver. Another notable advantage to Wake-on-LAN is that no changes are required to the substance of the network traffic. Embodiments described in this specification may operate independent of the substance of network traffic.

Figure 1:
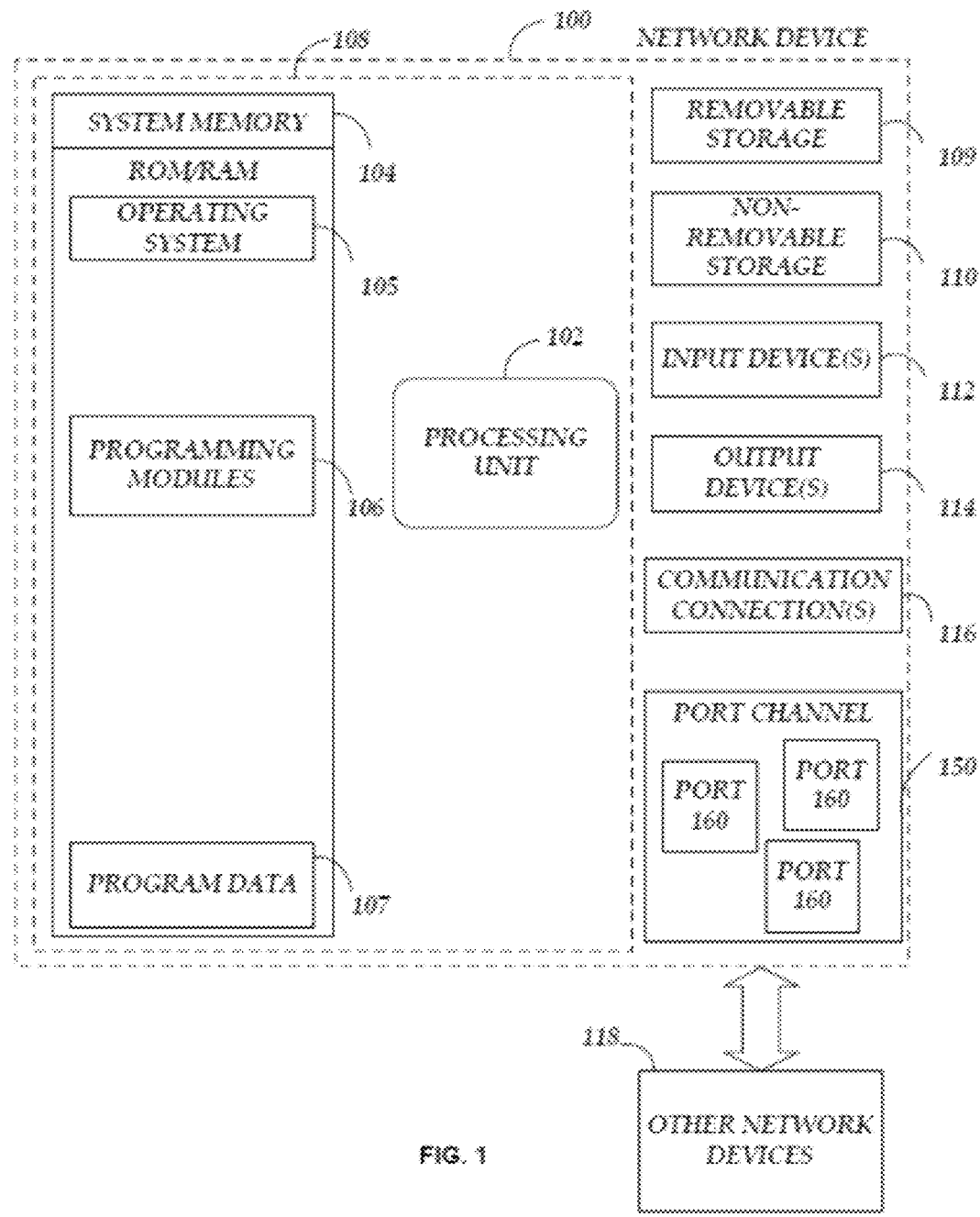
FIG. 1 is a block diagram illustrating an example environment in which certain embodiments of the present disclosure may be implemented.

FIG. 1 is a block diagram of a system including network device 100. Embodiments of Wake-on-LAN may be implemented in a network device, such as network device 100 of FIG. 1. In embodiments, network device 100 may be a network host, network transceiver, or other suitable network device. Any suitable combination of hardware, software, or firmware may be used to implement embodiments of Wake-on-LAN. For example, embodiments of Wake-on-LAN may be implemented with network device 100 or any of other network devices 118. The aforementioned system, device, and processors are examples and other systems, devices, and processors may comprise the aforementioned memory storage and processing unit, consistent with embodiments of Wake-on-LAN. Furthermore, network device 100 may comprise an operating environment as described above.

With reference to FIG. 1, a system consistent with embodiments of Wake-on-LAN may include a network device, such as network device 100. In a basic configuration, network device 100 may include at least one processing unit 102 and a system memory 104. Depending on the configuration and type of network device, system memory 704 may comprise, but is not limited to, volatile (e.g., random access memory (RAM)), non-volatile (e.g., read-only memory (ROM)), flash memory, or any combination. System memory 104 may include operating system 105, one or more programming modules 106, and may include program data 107. Operating system 105, for example, may be suitable for controlling network device 100's operation. Furthermore, embodiments of Wake-on-LAN may be practiced in conjunction with a operating systems, or any other application program and is not limited to any particular application or system. This basic configuration is illustrated in FIG. 1 by those components within a dashed line 108.

Network device 100 may have additional features or functionality. For example, network device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 100. Any such computer storage media may be part of device 100. Network device 100 may also have input device(s) 112 such as a keyboard, a mouse, a pen, a sound input device, a touch input device, etc. Output device(s) 114 such as a display, speakers, a printer, etc. may also be included. The aforementioned devices are examples and others may be used.

Network device 100 may also contain a communication connection 116 that may allow network device 100 to communicate with other network devices 118, such as over a network in a distributed network environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 104, including operating system 105. While executing on processing unit 102, programming modules 106 may perform processes including, for example, one or more of the methods as described below.

Figure 2:
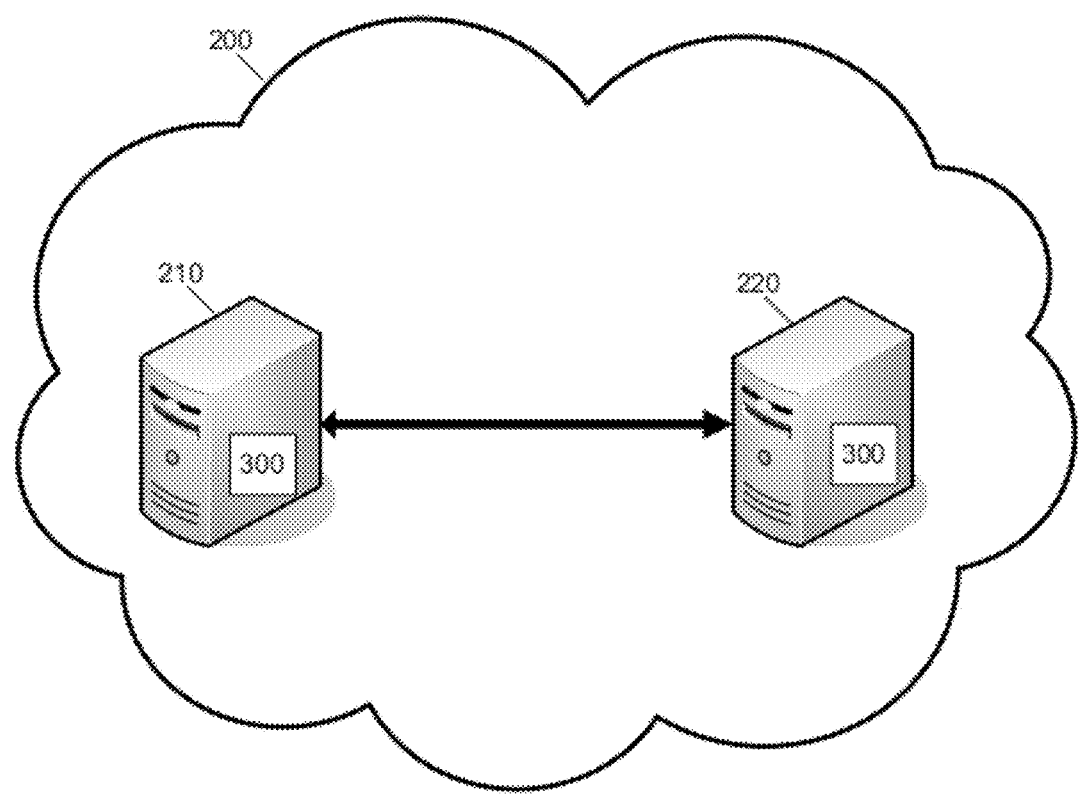
FIG. 2 is a block diagram illustrating an example environment in which certain embodiments of the present disclosure may be implemented.

FIG. 2 illustrates an operating environment for embodiments of the present specification. A network device, such as host 210 may be in communication with a network device, such as transceiver 220, within a network 200. In embodiments of the present disclosure, host 210 and transceiver 220 may comprise optical modules 300 or optical link partners which need to be powered up or awaked from a standby mode when there is traffic to be initiated. Optical modules 300 are described in further detail in FIG. 3.

Host 210 may write a predefined value to a pre-defined Management Data Input/Output ("MDIO") or I2C address to enable Wake-on-LAN functionality depending on the transceiver form factor. The predefined value may be any value sufficient to indicate that said functionality is enabled to host 210 and transceiver 220. Transceiver 220 may be a power-saving capable transceiver module.

For example, transceiver 220 may have a Power Saving ("PS")_capable register (read-only). The PS_capable register may serve to alert host 210 that transceiver 220 is indeed a power-saving capable transceiver module. Similarly, transceiver 220 may have a PS_SELF register (read-write) and a PS_PARTNER register (read only) with a number of states. The states may include: NORMAL, PS_INIT, PS_INIT_ACT, PS, NM_INIT, and NM_INIT_ACT states. These states will be described in greater detail below.

Host 210 may reach a time during operation where there is no traffic to be sent. At such time, host 210 may enter a power saving mode. Host 210 may send the pre-defined MDIO to transceiver 220. In some embodiments, this may be sent as a 2-Wire command. Host 210 may initiate power saving mode by adjusting the average TX optical power at a fixed low frequency. For example, the frequency may be set as 200 Hz. While embodiments may employ various frequencies, it has been seen that 200 Hz may allow for certain advantages as discussed further below.

After it has been determined that transceiver 220 is capable and willing to implement power saving techniques, transceiver 220 may respond by adjusting its TX optical power at a similar or same low frequency level to acknowledge host 210's power saving request. Subsequently, host 210 may detect this acknowledgement and enter a Power Saving ("PS") state.

Later, host 210 may recognize that it has traffic to send and may initiate a procedure to exit the PS state. Host 210 may send an idle pattern (without average TX optical power varied at the fixed low frequency, and with TX laser set at 100%). Transceiver 220 may acknowledge by sending an idle pattern (without average TX optical power varied at the fixed low frequency). The acknowledgement from transceiver 220 may last for a period of time, such as 20 mS. After the acknowledgement concludes, transceiver 220 may return back to a NORMAL state. Similarly, after host 210 detects the acknowledgement, host 210 will also return back to a NORMAL state.

When a network device is operating in a PS state, this may mean that the TX laser is on only for 20 mS out of every 100 mS (or any other appropriate ratio). Also, while the TX laser is operating it operates a TX power varied at the fixed low frequency. Host 210 may ignore RX data from other modules while in PS state. As the laser may be off 80% of the time in this scenario, significant power savings may be achieved. TX laser driver power is allowed to be turned off if supported by transceiver 220. Similarly, RX power is allowed to be turned off if supported by transceiver 220. Also part of the PHY/SerDes power may be allowed to be turned off to save power. It should be understood that power still needs to be provided to the MDIO and the microcontroller contained in the network devices.

Figure 3:
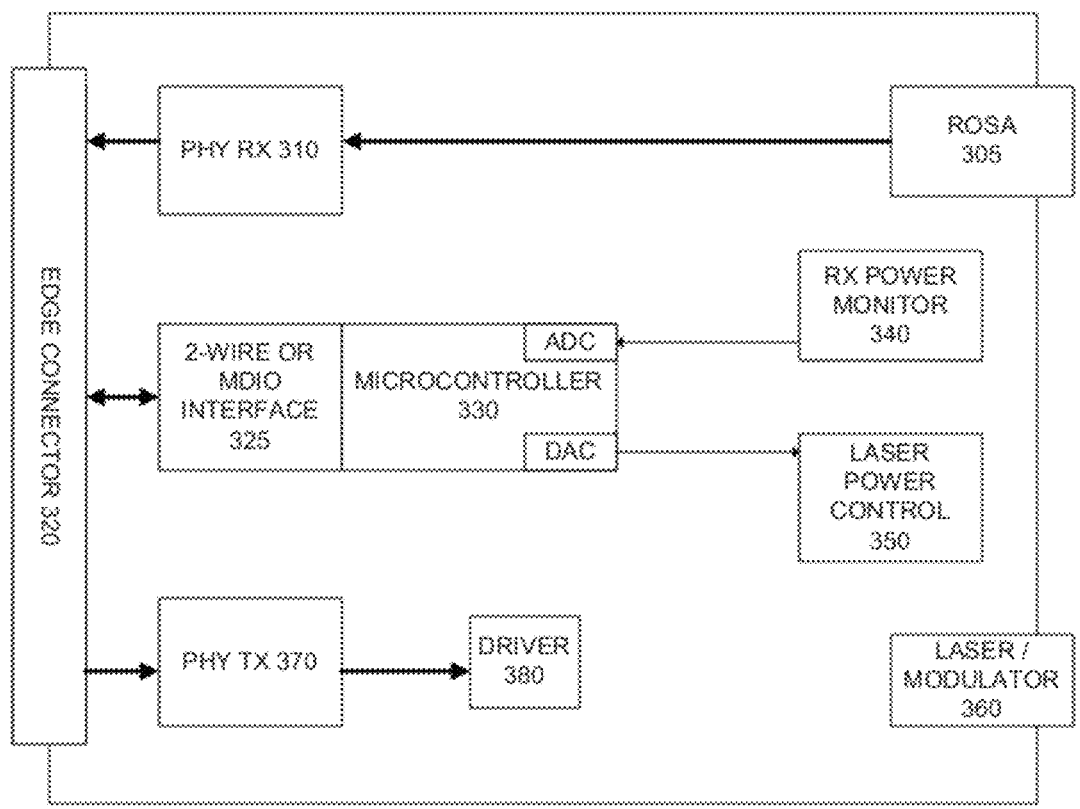
FIG. 3 is a block diagram illustrating an optical module environment in which certain embodiments of the present disclosure may be implemented.

FIG. 3 illustrates an example schematic of an optical transceiver module 300 of transceiver 220. A Receiver Optical Sub-Assembly 305 may be in communication with RX unit 310. RX unit 310 may be in communication with an edge connector 320. Edge connector 320 may be in communication with any number of other network devices.

Similarly, a management interface 325 and microcontroller 330 may be in communications with edge connector 320. Microcontroller 330 may comprise an analog to digital converter ("ADC") 334 and a digital to analog converter ("DAC") 336. ADC 334 may receive instructions from a RX power monitor 340. DAC 336 may be in communication with laser power control unit 350. Laser power control unit 350 may be used to effect changes in power at a laser 360. Finally, optical transceiver module 300 may comprise a TX unit 370 in communications with a driver 380.

Figure 4:
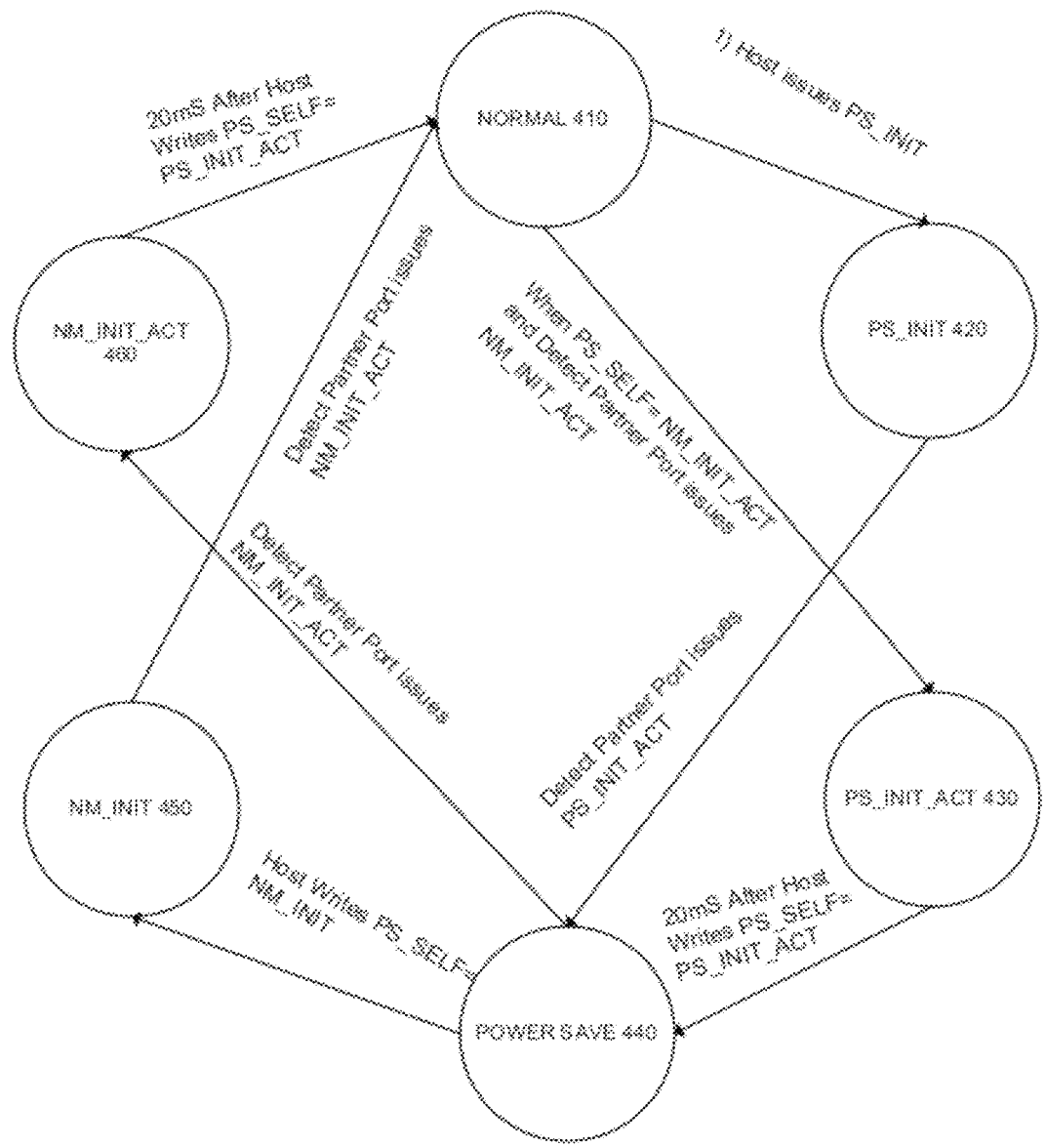
FIG. 4 is a state diagram illustrating example embodiments of the present disclosure.

FIG. 4 is a state diagram illustrating the paths between the various state described above. NORMAL state 410 represents a state where a transceiver module A (or B) may be sending traffic in a normal manner. The Average Output Power ("AOP") will not be varied in NORMAL state 410. No power cuts are made in NORMAL state 410 and laser 360 operates at 100%. In NORMAL state 410, traffic to be transmitted is handled through normal Ethernet packets or idle patterns. Similarly, in NORMAL state 410, the receiving of traffic is handled in the normal way.

PS_INIT state 420 represents a state where a transceiver module A (or B) may initiate the handshake for entering into power saving mode. AOP power may now be varied in PS_INIT state 420 at the pre-defined low frequency. No power cuts are made during PS_INIT state 420 and laser 360 still operates at 100%. In PS_INIT state 420, transmission is handled with idle patterns only. In PS_INIT state 420, the receiving of traffic is still handled in the normal way. PS_INIT state 420 may be initiated when a host, such as host 210, thinks it has no traffic to send.

PS_INIT_ACT state 430 represents a state where a transceiver module B (or A) may acknowledge to the handshake for entering into power saving mode received from the first module. AOP power is still varied in PS_INIT_ACT state 430 at the pre-defined low frequency. No power cuts are made in PS_INIT_ACT state 430 and laser 360 still operates at 100%. In PS_INIT_ACT state 430, transmission is handled with idle patterns only. In PS_INIT_ACT state 430, the host may ignore received data. It should be noted that PS_INIT_ACT state 430 may only last for a brief period of time, such as 20 mS.

PS state 440 represents the power saving state where a transceiver module A (or B) enter into the power saving mode as described above. AOP power is still varied in PS state 440 at the pre-defined low frequency. Power cuts may now be made in PS state 440 and described above and laser 360 now operates at a reduced percentage, such as 20%. In PS state 440, there may be no line rate optical modulation. In PS state 440, the host may ignore received data.

NM_INIT state 450 represents a state where a transceiver module A (or B) may initiate the handshake for entering into normal mode. AOP power may now discontinue the variations from PS state 450 at the pre-defined low frequency. Similarly, the power cuts made in PS_INIT state 420 are now disabled. Laser 360 will also again operate at 100%. In NM_INIT state 450, transmission is handled with idle patterns only. In NM_INIT state 450, the receiving of traffic is still ignored until reaching NM_INIT_ACT state 460. NM_INIT state 450 may be initiated when a host, such as host 210, thinks it now has traffic to send.

NM_INIT_ACT state 460 represents a state where a transceiver module B (or A) may acknowledge the partner port handshake for entering into normal mode. AOP power may not be varied. Similarly, the power cuts made in the PS_INIT state remain disabled. Laser 360 will operate at 100%. In NM_INIT_ACT state, transmission is handled with idle patterns only. In NM_INIT_ACT state, the receiving of traffic is returned to normal operation. It should be noted that the NM_INIT_ACT state may only last for a brief period of time, such as 20 mS.

When a transceiver is powered up or reset, it may begin in NORMAL state 410. Similarly, NORMAL state 410 may be reached upon completion of NM_INIT_STATE 460. In some embodiments of the present disclosure, NORMAL state 410 may be achieved 20 mS after a host, such as host 210 writes PS_SELF=NM_INIT_ACT. Similarly, the transceiver may depart NORMAL state 410 upon host 210 issuing a PS_INIT message. Alternatively, it may be detected that a partner port issues a PS_INIT message and host 210 writes PS_SELF=NM_INIT_ACT. Finally, NORMAL state 410 may be departed when host 210 PS_SELF=NM_INIT and a partner port issues a NM_INIT_ACT message.

The active state may shift from NORMAL state 410 to PS_state 420 after host 210 writes PS_SELF=PS_INIT. PS_INIT state 420 may remain active until it is detected that the partner port has issued a PS_INIT_ACT message, at which point the active state may shift to PS state 440. The active state may shift from NORMAL state 410 to PS_INIT_ACT state 430 after host 210 writes PS_SELF=NM_INIT_ACT. PS_INIT_ACT state 430 may last for a pre-determined time period, such as 20 mS.

After the pre-determined time period elapses, the active state may move to PS state 440. PS state 440 may also be reached upon detecting that a partner port PS_INIT_ACT message from PS_INIT state 420. The active state may move from PS state 440 to NM_INIT stage 450 if either host 210 writes PS_SELF=NM_INIT. Alternatively, the active state may move from PS state 440 to NM_INIT_ACT stage 460 if it is detected that a partner port issues a NM_INIT message.

Once NM_INIT stage 450 is reached, the active state may be shifted to NORMAL state 410 upon detection that the partner port has issued a NM_INIT_ACT message. After NM_INIT_ACT state 460 is reached, the active state may return to NORMAL state 410 after a pre-determined time period elapses, such as 20 mS after host 210 writes PS_SELF=PS_INIT_ACT.

Figure 5:
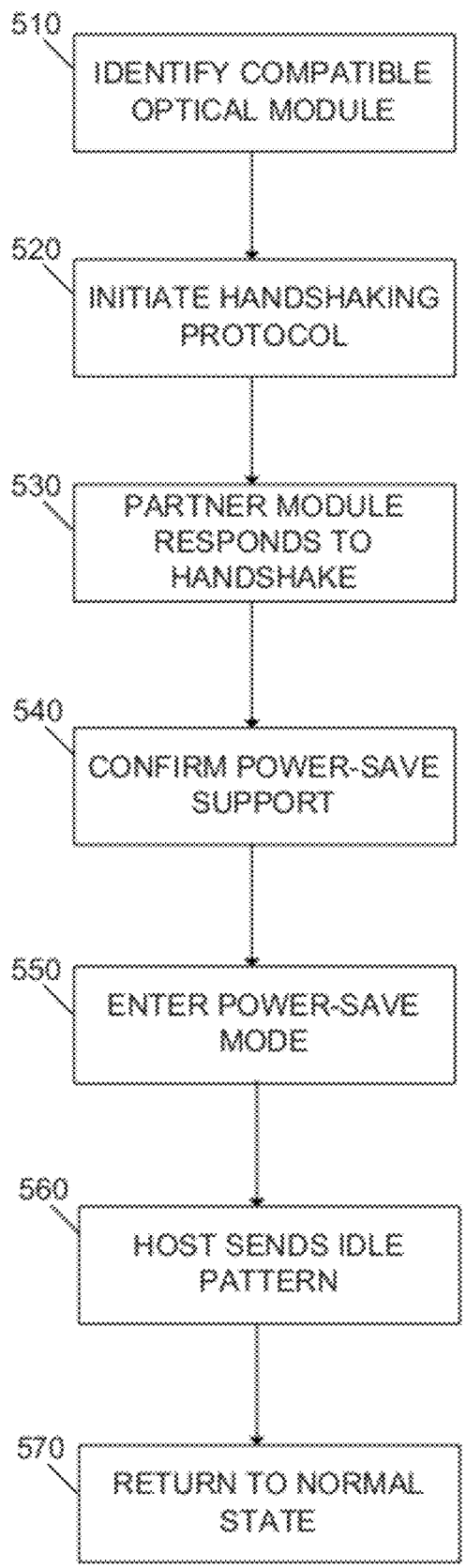
FIG. 5 is a flow chart illustrating example embodiments of the present disclosure.

FIG. 5 is a flow chart illustrating embodiments of the present disclosure. The method may begin at step 510 where a network device acting as a host, such as host 210, checks to determine whether an optical module is compatible with Wake-on-LAN activities. This may be accomplished by reading an identifier maintained by the optical module via the MDIO register upon detection of the presence of the optical module. In some embodiments, an Inter-Integrated Circuit may be employed to detect the presence of the optical module.

If a Wake-on-LAN capable, the method may advance to step 520 where the host may initiate power-saving handshaking. The power saving handshaking may be accomplished via message sending or an adjustment of the TX optical at the pre-determined low frequency. Subsequently, the method may proceed to step 530 where a partner module may listen and respond to the adjusted TX optical power at the same pre-determined low frequency.

Next, the method may proceed to step 540, where both a near-end and a far-end host may confirm Wake-on-LAN capable link support. Once support is established, the method may move to step 550 where it may be detected that there is no immediate traffic and both modules may go into a standby or hibernating state where the transmit laser may switch on and off at a reduced duty cycle, such as 20%.

If either of the modules decides to return to a normal traffic mode, the method may proceed to step 560 where the host may begin sending an idle pattern which may result in the discontinuation of the TX laser cycling at the pre-determined low frequency. The method may then proceed to step 570 where the partner module may then detect the absence of the TX laser cycling at the pre-determined low frequency and subsequently prepare itself for receipt of normal data traffic. The achieved normal mode may continue until either module initiates power saving mode again.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

At least the following is claimed:

1. A method comprising:
    determining that an optical module is capable of entering a power saving mode based at least in part on the value of a power saving capable register, wherein the power saving capable register is stored in a memory associated with a transceiver, wherein the memory further stores a partner device power saving capable register;
    initiating a power saving handshake;
    confirming the power saving handshake;
    adjusting the optical module to a power saving mode; and
    sending an idle pattern, wherein the idle pattern serves to end the established power saving mode.

2. The method of claim 1, wherein the step of determining that an optical module is capable of entering a power saving mode further comprises reading an identifier associated with the optical module.

3. The method of claim 2, wherein the identifier is stored at a MDIO or I2C register address associated with the optical module depending on the module form factor.

4. The method of claim 1, wherein the step of initiating a power saving handshake further comprises adjusting the power of a laser in the optical module at a pre-determined low frequency.

5. The method of claim 4, wherein the step of confirming the power saving handshake further comprises a second optical module responding at the pre-determined low frequency.

6. The method of claim 1, wherein the handshaking protocol is channel independent from the normal data traffic path.

7. The method of claim 5, wherein the pre-determined low frequency is 200 Hz.

8. A method comprising:
    operating a first optical module in a normal state;
    initiating a first handshake to enter the first optical module in a power saving mode based at least in part on the value of a power saving capable register, wherein the power saving capable register is stored in a memory associated with a transceiver, wherein the memory further stores a partner device power saving capable register;
    receiving acknowledgement of the first handshake from a second optical module;
    entering the first optical module into the power saving mode;
    initiating a second handshake to enter the first optical module in the power saving mode;
    receiving acknowledgement of the second handshake from the second optical module; and
    exiting the power saving mode upon receipt of an idle pattern.

9. The method of claim 8, wherein the power saving mode comprises operating a laser associated with the first optical module for a limited time period out of each predetermined time segment.

10. The method of claim 9, further comprising:
    varying the laser power at a predetermined fixed low frequency.

11. The method of claim 8, further comprising:
    detecting the presence of the first optical module; and
    reading an identifier that identifies the first optical module as power saving capable.

12. The method of claim 11, further comprising:
    if it is determined that the first optical module is not capable of power saving, continuing normal state operation.

13. The method of claim 12, further comprising:
    initiating a first handshake to enter the first optical module in a power saving mode only after a determination that there is no immediate traffic to be sent.

14. A network device comprising:
    an optical transceiver module comprising:
    a power saving capable register;
    a partner device power saving capable register;
    a laser; and
    a processor programmed to:
    determine whether the optical transceiver module is power saving capable based at least in part on the value of the power saving capable register;
    initiate a power saving mode upon a successful handshake with a second optical module;
    adjust the duty cycle of the laser to a power saving level; and
    discontinue the power saving mode upon receipt of an idle pattern.

15. The network device of claim 14, further comprising a MDIO register storing information sufficient to identify the network device as power saving capable.

16. The system of claim 15, further comprising a microcontroller to implement the handshaking procedure.

17. The system of claim 16, wherein the handshaking procedure occurs over a 1 KHz channel.

18. The system of claim 16, wherein the microcontroller is in communication with a laser power controller to adjust the duty cycle of the laser to a power saving level.

19. The system of claim 17, wherein, the handshaking procedure comprises: adjusting the optical power of the laser to a fixed pre-determined frequency.

20. The system of claim 19, wherein the fixed pre-determined frequency is 200 Hz.

* * * * *